(12) United States Patent
Liu

(10) Patent No.: US 8,050,020 B2
(45) Date of Patent: Nov. 1, 2011

(54) KEYBOARD BASE

(75) Inventor: Gang-Hua Liu, Shenzhen (CN)

(73) Assignees: Hong fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 180 days.

(21) Appl. No.: 12/512,945

(22) Filed: Jul. 30, 2009

(65) Prior Publication Data

US 2010/0149741 A1  Jun. 17, 2010

(30) Foreign Application Priority Data

Dec. 11, 2008  (CN) .......................... 2008 1 0306181

(51) Int. Cl.
*G06F 1/16* (2006.01)
*H05K 5/00* (2006.01)
*H05K 7/00* (2006.01)
(52) U.S. Cl. .............................. 361/679.17; 361/679.09
(58) Field of Classification Search ... 361/679.08–679.2
See application file for complete search history.

(56) References Cited

U.S. PATENT DOCUMENTS

| | | | | | |
|---|---|---|---|---|---|
| 5,443,320 | A | * | 8/1995 | Agata et al. ................. | 400/715 |
| 5,510,953 | A | * | 4/1996 | Merkel ..................... | 361/679.08 |
| 5,546,334 | A | * | 8/1996 | Hsieh et al. ................ | 708/141 |
| 5,659,307 | A | * | 8/1997 | Karidis et al. ................ | 341/22 |
| 5,774,329 | A | * | 6/1998 | Kuo ......................... | 361/679.17 |
| 5,966,284 | A | * | 10/1999 | Youn et al. ................ | 361/679.17 |
| 6,212,066 | B1 | * | 4/2001 | Fetterman ................ | 361/679.17 |
| 6,493,215 | B1 | * | 12/2002 | Chiang et al. ............ | 361/679.08 |
| 6,672,796 | B2 | * | 1/2004 | Chiang et al. ................ | 403/327 |
| 7,102,878 | B2 | * | 9/2006 | Yu et al. ................... | 361/679.09 |
| 7,184,262 | B2 | * | 2/2007 | Hsu et al. ................. | 361/679.27 |
| 7,265,969 | B2 | * | 9/2007 | Jin .......................... | 361/679.09 |
| 7,447,008 | B2 | * | 11/2008 | Wang ...................... | 361/679.55 |
| 2004/0012509 | A1 | * | 1/2004 | Chen ............................ | 341/22 |
| 2005/0018391 | A1 | * | 1/2005 | Jin .............................. | 361/680 |
| 2008/0144262 | A1 | * | 6/2008 | Lai .............................. | 361/680 |

\* cited by examiner

*Primary Examiner* — Jayprakash N Gandhi
*Assistant Examiner* — Adrian S Wilson
(74) *Attorney, Agent, or Firm* — Altis Law Group, Inc.

(57) ABSTRACT

A keyboard base includes a frame, a key panel, and a latching assembly having a stop plate, a sliding block and an elastic member. The frame includes a housing defined therein, a hook formed on a bottom of the housing, and a blind slot defined on a side wall of the housing. The key panel is received in the housing of the frame and includes a clasp snapped in the blind slot of the housing. The stop plate is perpendicularly mounted on the key panel facing the hook of the frame. The sliding block is slidably positioned between the stop plate and the hook of the frame. The elastic member is positioned between the sliding block and the stop plate for keeping the sliding block retaining on the hook of the frame to detachably fasten the key panel and the frame.

16 Claims, 5 Drawing Sheets

KEYBOARD BASE

BACKGROUND

1. Technical Field

The disclosure relates to a keyboard base, and more particularly, to a keyboard base for using in laptop or desk computer.

2. Description of Related Art

Most keypads and their keys are permanently fixed to their housing, that is, the keyboard. To accommodate different languages, such as Chinese, having keys showing different input characters on them, the entire keyboard must be replaced. This is costly and also inconvenient.

Therefore, what is needed is to provide a keyboard base, in which the above problem is eliminated or at least alleviated.

DETAILED DESCRIPTION

Figure 1:
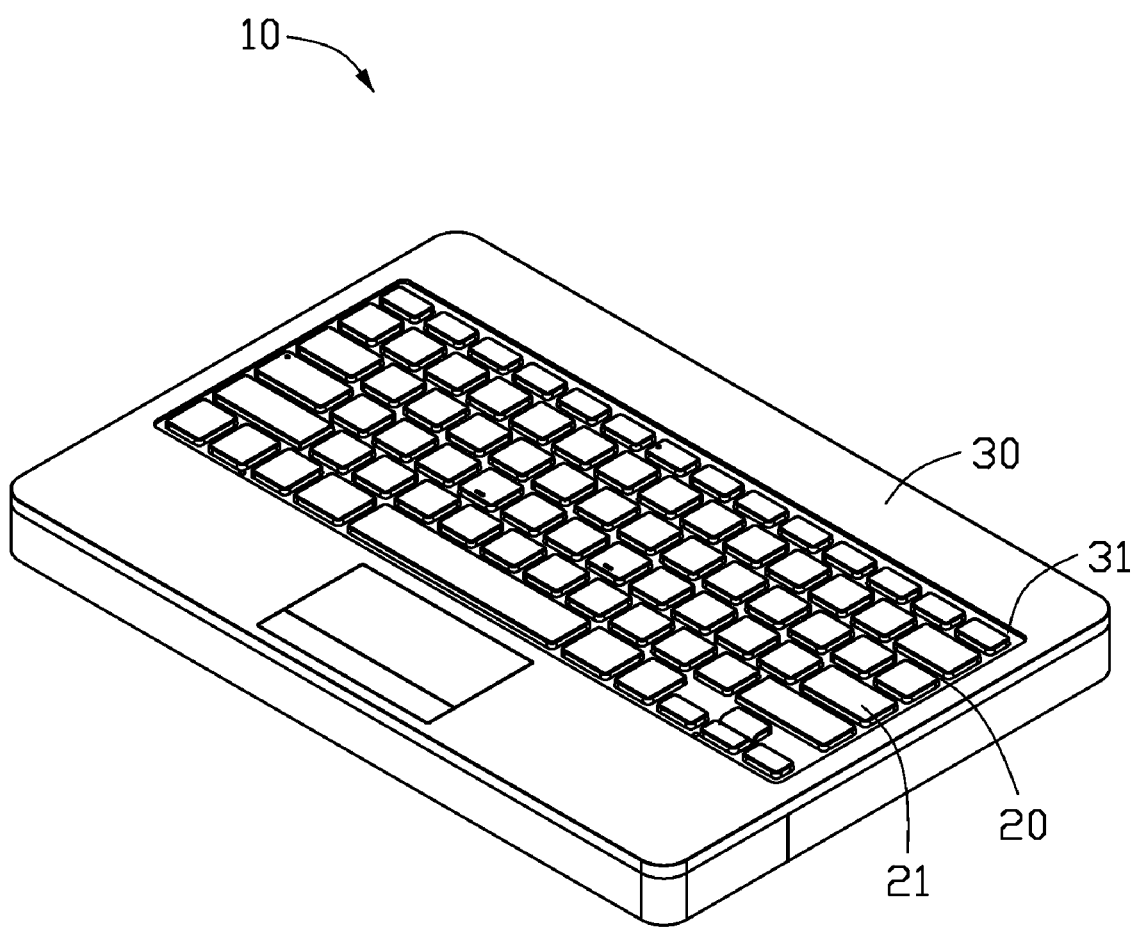
FIG. 1 is an isometric view of a keyboard base in accordance with a preferable embodiment of the present invention.
Figure 2:
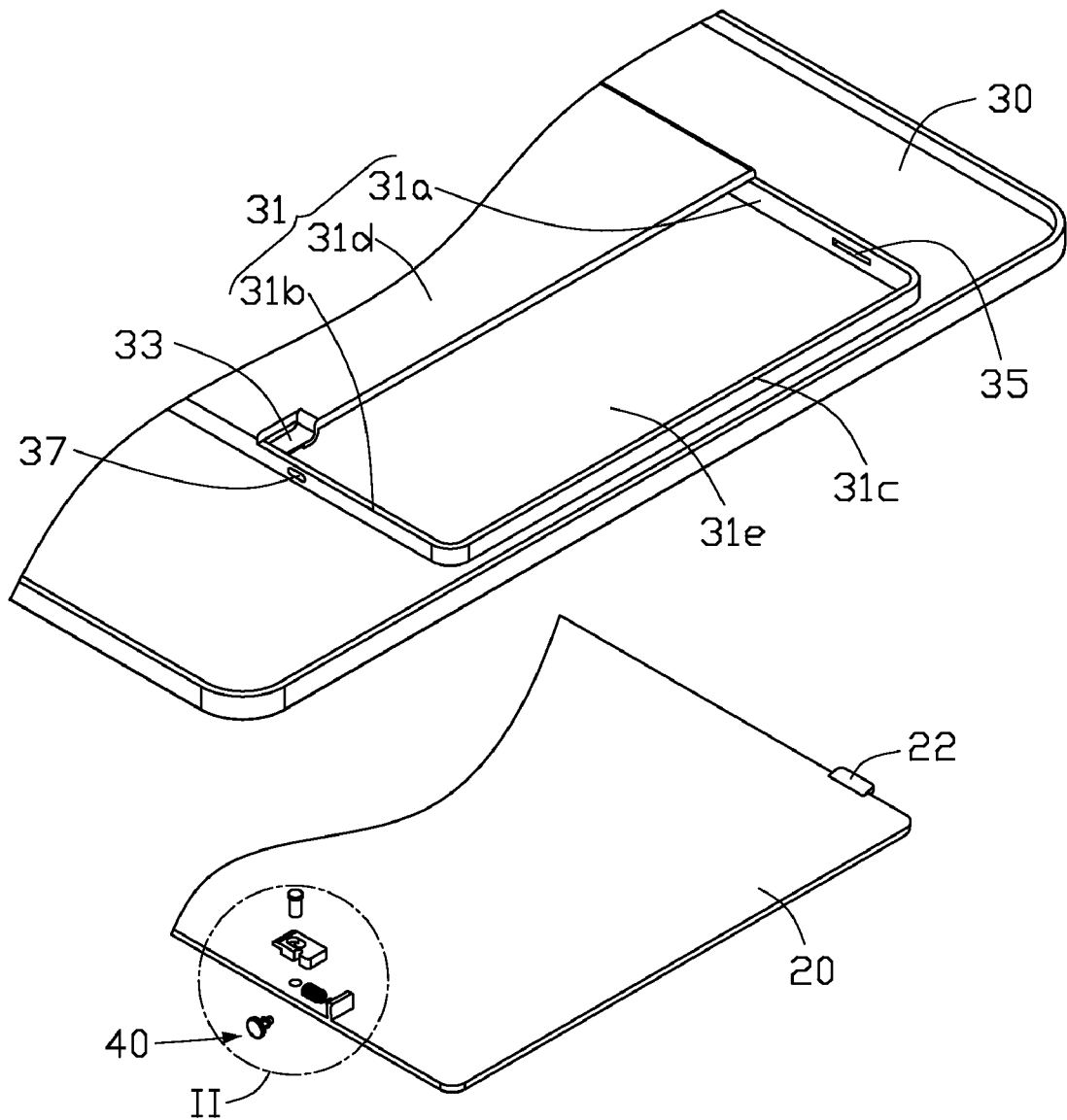
FIG. 2 is an exploded isometric view of a partially section of the keyboard base of FIG. 1.

Referring to FIGS. 1 and 2, a keyboard base 10 includes a key panel 20 with a number of buttons 21 arrayed thereon, a frame 30 defining a housing 31 for receiving the key panel 20 therein, and a latching assembly 40 mounted on the key panel 20 for fastening the key panel 20 and the frame 30.

Referring to FIG. 2, the housing 31 includes a first wall 31a, a second wall 31b opposite to the first wall 31a, a third wall 31c and a rectangular bottom plate 31d. The third wall 31c is connected to the first wall 31a and the second wall 31b. The rectangular bottom plate 31d covers the upper portions of the first and second walls 31a, 31b. The inner side of the first wall 31a defines at least one blind slot 35. The second wall 31b defines a first guiding channel 37 running through opposite surfaces of the second wall 31b. Also referring to FIG. 5, the first guiding channel 37 is substantially rectangular shaped and defines two concave ends. A length of the bottom plate 31d along an extending direction of the first and second walls 31a, 31b is smaller than that of the first and second walls 31a, 31b, thereby a window 31e is formed between a side of the bottom plate 31d and the third wall 31c. The bottom plate 31d includes a hook 33 formed on a side adjacent to the second wall 31b by punching a periphery portion of the bottom plate 31d downwards.

The key panel 20 includes at least one clasp 22 extending from an edge of the key panel 20 to engage into the blind slot 35 of the first wall 31a correspondingly.

Figure 3:
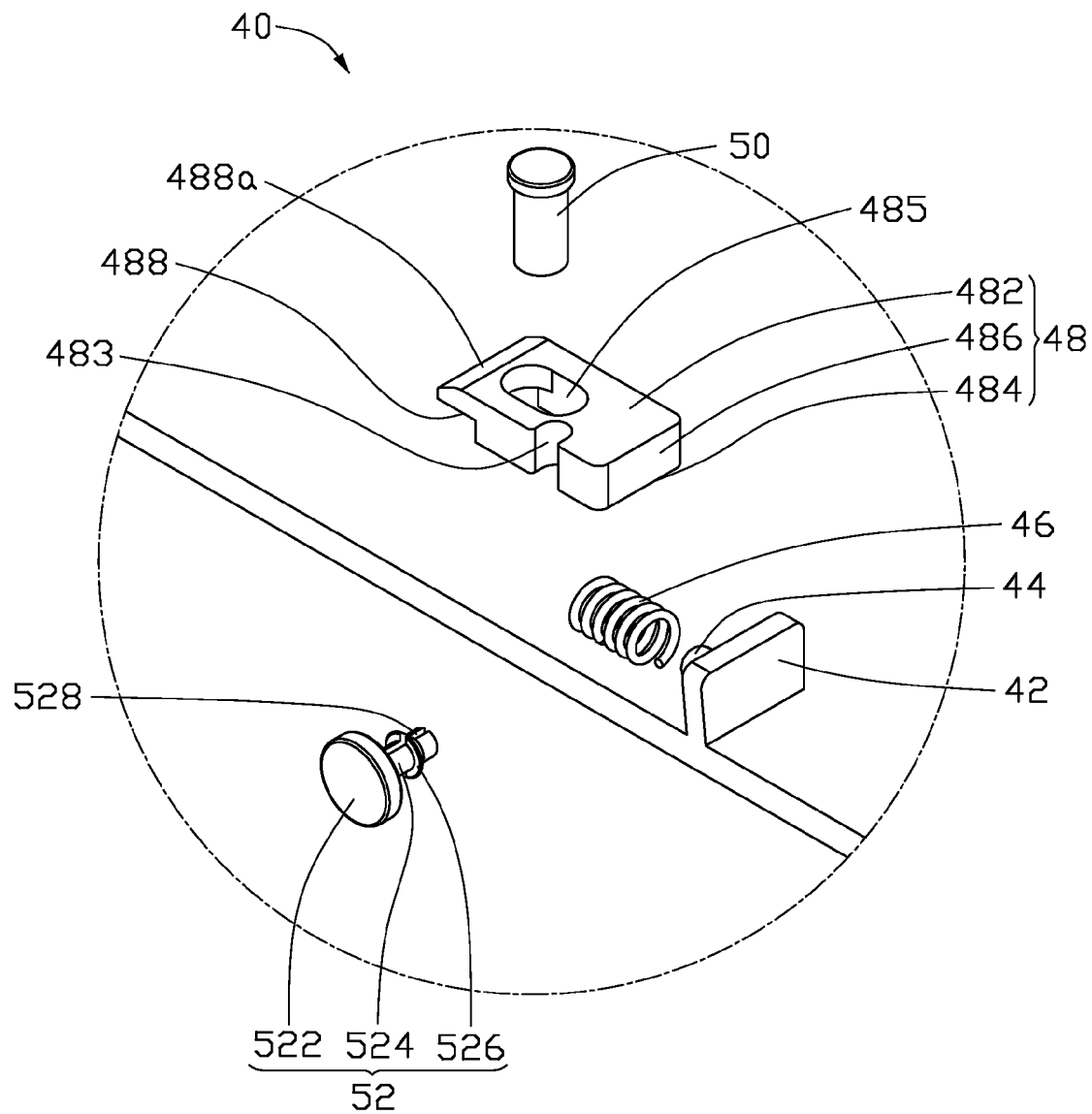
FIG. 3 is an enlarged isometric view of a circled portion TI of FIG. 2.
Figure 4:
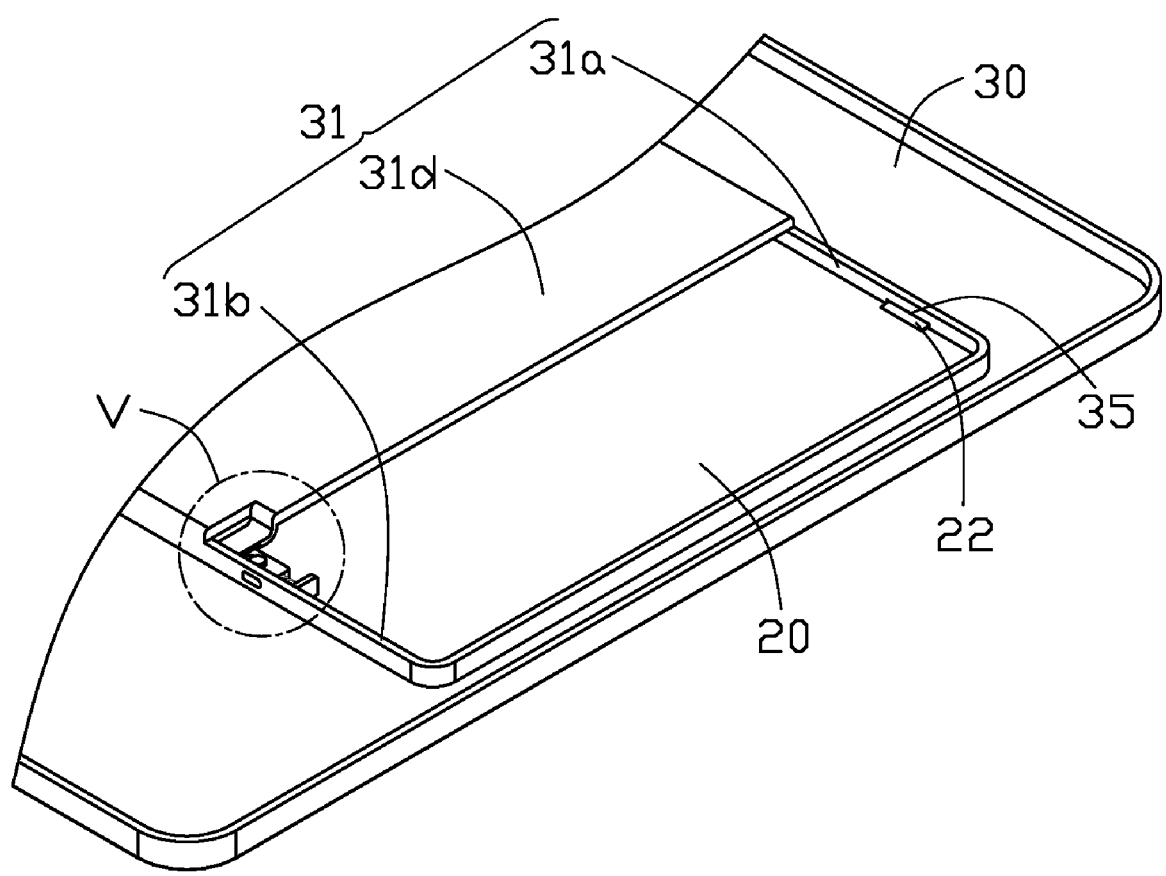
FIG. 4 is an assembled view of FIG. 2.
Figure 5:
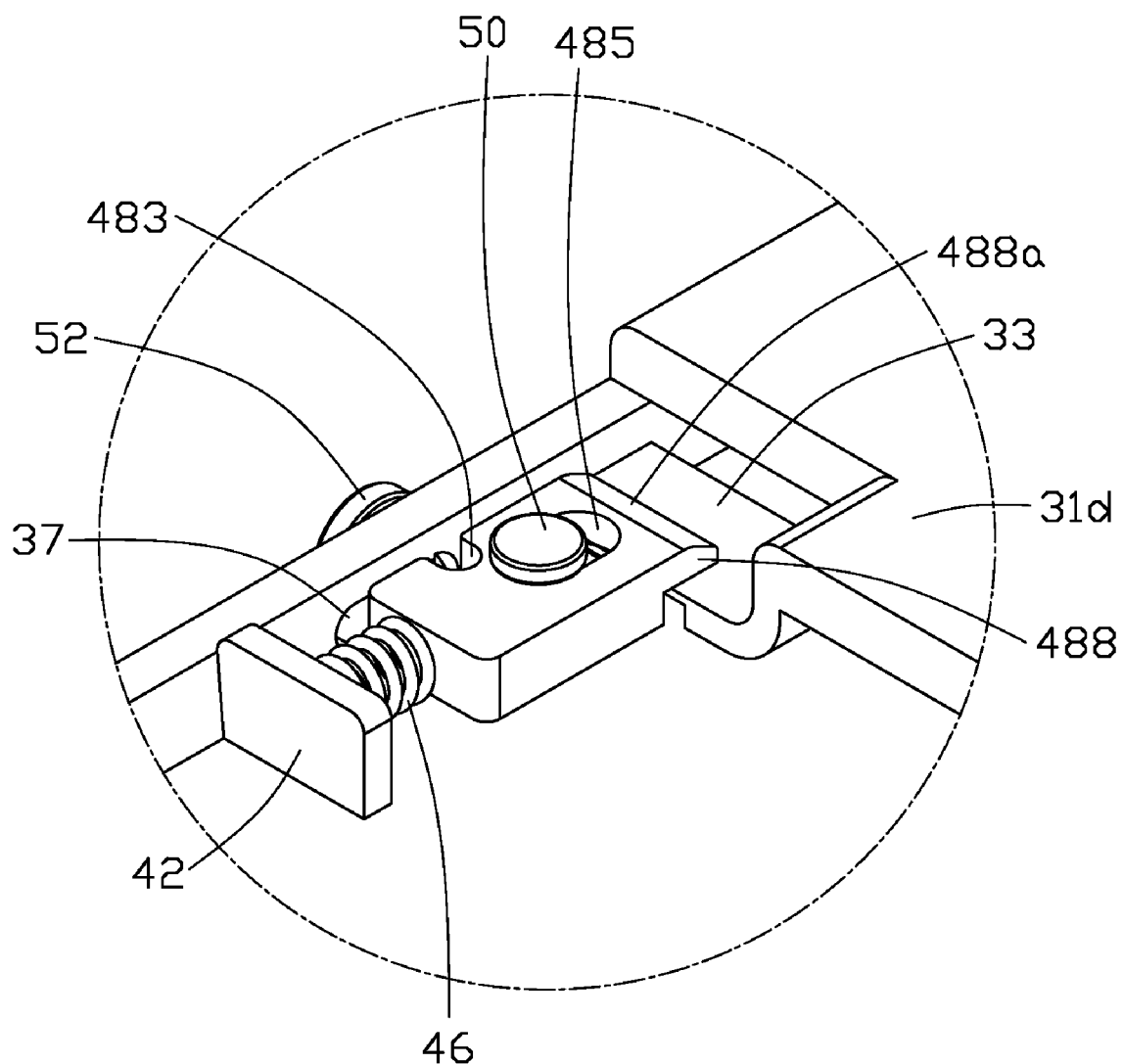
FIG. 5 is an enlarged isometric view of a circled portion V of FIG. 4.

Referring FIGS. 3-5, the latching assembly 40 includes a stop plate 42, a short rod 44, an elastic member 46, a sliding block 48, a guiding pole 50 and a pushing member 52. The stop plate 42 is perpendicularly mounted on the upper surface of the key panel 20 in a manner facing the hook 33 of the bottom plate 31d, and slightly offsets with the first guiding channel 37 towards the third wall 31c. The short rod 44 is perpendicularly extending from the stop plate 42 towards the hook 33. A normal length of the elastic member 46 is longer than that of the short rod 44. The elastic member 46 is fitted on the short rod 44. The sliding block 48 is a cube and includes an upper surface 482, a lower surface 484 opposite to the upper surface 482, and a number of side surfaces 486 connected to the upper and lower surfaces 482, 484. The sliding block 48 further includes a tab 488, a groove 483, and a second guiding channel 485. The tab 488 extends outward from one of the side surfaces 486. The tab 488 has an inclined surface 488a connected to the upper surface 482. The groove 483 runs through the upper, lower surfaces 482, 484 and protrudes out from another one of the side surfaces 486 adjacent to the tab 488. The groove 483 is aligned with the first guiding channel 37 of the second wall 31b. The second guiding channel 485 runs through the upper surface 482, the lower surface 484 and a portion of the tab 488. The sliding block 48 is slidably attached on the key panel 20 by the guiding pole 50. The guiding pole 50 passes through the second guiding channel 485 of the sliding block 48 and is attached on the upper surface of the key panel 20. The guiding pole 50 is configured for limiting the sliding path and range of the sliding block 48. The sliding block 48 abuts the elastic member 46.

The pushing member 52 includes a cap 522, a pin 524, and a tilted flange 526. The pin 524 extends from the center of a surface of the cap 522. The tilted flange 526 radially protrudes from an outside of the pin 524 at middle portion of the pin 524. The pushing member 52 is made of flexible material and further includes a gap 528 diametrically running through the pin 524 from a terminal surface of the pin 524 to approach adjacent to the cap 522. The gap 528 divides the pin 524 and the tilted flange 526 into a couple of flexional portions which can be bent inwards through the guiding channel 37 easily. The pin 524 of the pushing member 52 enters the groove 483 of the sliding block 48 by passing through the first guiding channel 37 of the second wall 31b. The tilted flange 526 abuts the second wall 31b for preventing the pin 524 from disengaging with the first guiding channel 37.

In assembly, the clasp 22 of the key panel 20 is snapped into the blind slot 35 of the first wall 31a, and the locking tab 488 of the latching assembly 40 is retained on the hook 33, thereby the key panel 20 is received in the window 31e of the frame 30. In the process of fastening the key panel 20 by the latching assembly 40, the inclined surface 488a of the tab 488 is pressed against the hook 33 when the key panel 20 is pushed. The inclined surface 488a guides the tab 488 to slide relative to the guiding pole 50 towards the stop plate 42 and compress the elastic member 46. When the tab 488 moves beyond the hook 33, the elastic member 46 restores or resets the tab 488 to its original position, thereby the tab 488 is retained on the hook 33 to fasten the key panel 20 on the frame 30. When detaching the key panel 20 from the frame 30, firstly the pushing member 52 is pushed to slide along the first guiding channel 37 to disengage the tab 488 from the hook 33, then the key panel 20 rotates relatively to the first wall 31a of the frame 30 to detach the clasp 22 from the blind slot 35 of the first wall 31a.

In present invention, the latching assembly 40 is employed to fasten the key panel 20 easily, which is very convenient to attach or detach the key panel 20 from the frame 30.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A keyboard base comprising:
a frame comprising a housing, a hook formed on a bottom of the housing, and a blind slot defined on the housing;
a key panel received in the housing and comprising a clasp snapped into the blind slot of the housing; and
a latching assembly mounted on the key panel for detaching the key panel from the frame, the latching assembly comprising:
a stop plate perpendicularly mounted on the key panel and facing the hook;
a sliding block slidably positioned between the stop plate and the hook; and
an elastic member positioned between the sliding block and the stop plate for keeping the sliding block on the hook of the frame to detachably fasten the key panel and the frame;
wherein the frame includes a first wall, a second wall opposite to the first wall, a third wall connected to the first and second walls, and a rectangular bottom plate covered on the upper portions of the first and second walls; the blind slot is defined on the first wall; and the hook is formed on a side edge of the bottom adjacent to the second wall;
the latching assembly further comprises a short rod perpendicularly extending from the stop plate towards the hook to engage with the elastic member;
the latching assembly further comprises a guiding pole mounted on the key panel for limiting a sliding path and a sliding range of the sliding block;
the second wall comprises a first guiding channel running through the second wall and adjacent to the bottom plate; while the latching assembly further comprises a pushing member passing the first guiding channel of the second wall for engaging with the sliding block.

2. The keyboard base as claimed in claim 1, wherein the pushing member comprises a cap, a pin extending from the center of the cap, a tilted flange radially protruding from an outside of the pin at a middle portion thereof, and a gap diametrically running through the pin from a terminal surface of the pin to approach adjacent to the cap.

3. The keyboard base as claimed in claim 2, wherein the pushing member is made of flexible material.

4. The keyboard base as claimed in claim 1, wherein the sliding block comprises an upper surface, a lower surface opposite to the upper surface, a number of side surfaces connected to the upper and lower surfaces, and a tab extending from a side surface of the sliding block to face the hook of the frame.

5. The keyboard base as claimed in claim 4, wherein the tab comprises an inclined surface connected to the upper surface.

6. The keyboard base as claimed in claim 4, wherein the sliding block further comprises a groove running through the upper, lower surfaces and one of the side surfaces to align with the first guiding channel of the second wall.

7. The keyboard base as claimed in claim 6, wherein the sliding block further comprises a second guiding channel formed thereon and running through the upper, lower surfaces and a portion of the tab; and the guiding pole passes through the second guiding channel to mount on the key panel.

8. A keyboard base comprising:
a frame comprising a housing, a hook formed on a bottom of the housing, the frame further comprising a first wall defining a blind slot and a second wall opposite to the first wall, the second wall defining a first guiding channel running therethrough;
a key panel received in the housing and comprising a clasp snapped into the blind slot of the housing; and
a latching assembly comprising:
a sliding block slidably connected to the key panel, the sliding block residing on the hook, thereby detachably connecting the key panel to the frame; and
a pushing member passing the first guiding channel of the second wall for engaging with the sliding block.

9. The keyboard base according to claim 8, wherein the latching assembly further comprises a stop plate protruding from the key panel and an elastic member positioned between the sliding block and the stop plate to keep the sliding block on the hook.

10. The keyboard base according to claim 8, wherein the frame further comprises a third wall connected to the first and second walls, and a rectangular bottom plate covered on the upper portions of the first and second walls; the hook is formed on a side edge of the bottom adjacent to the second wall.

11. The keyboard base according to claim 10, wherein a length of the bottom plate along an extending direction of the first and second walls is smaller than that of the first and second walls, and a window is defined between a side of the bottom plate for receiving the key panel therein.

12. The keyboard base according to claim 8, wherein the latching assembly further comprises a guiding pole mounted on the key panel for limiting a sliding path and a sliding range of the sliding block.

13. The keyboard base according to claim 8, wherein the pushing member comprises a cap, a pin extending from the center of the cap, a tilted flange radially protruding from an outside of the pin at a middle portion thereof, and a gap diametrically running through the pin from a terminal surface of the pin to approach adjacent to the cap.

14. The keyboard base according to claim 8, wherein the sliding block comprises an upper surface, a lower surface opposite to the upper surface, a number of side surfaces connected to the upper and lower surfaces, and a tab extending from a side surface of the sliding block to face the hook of the frame.

15. The keyboard base according to claim 14, wherein the sliding block further comprises a groove running through the upper, lower surfaces and one of the side surfaces to align with the first guiding channel of the second wall.

16. The keyboard base according to claim 15, wherein the sliding block further comprises a second guiding channel formed thereon and running through the upper, lower surfaces and a portion of the tab; and the guiding pole passes through the second guiding channel to mount on the key panel.

* * * * *